United States Patent
Monks

(10) Patent No.: US 8,631,185 B2
(45) Date of Patent: Jan. 14, 2014

(54) METHOD AND SYSTEM FOR TRANSFERRING HIGH-SPEED DATA WITHIN A PORTABLE DEVICE

(75) Inventor: Morgan Monks, Tempe, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 399 days.

(21) Appl. No.: 12/883,149

(22) Filed: Sep. 15, 2010

(65) Prior Publication Data

US 2012/0066422 A1    Mar. 15, 2012

(51) Int. Cl.
*G06F 13/00*    (2006.01)

(52) U.S. Cl.
USPC .......................................... 710/313; 711/115

(58) Field of Classification Search
USPC .......................................... 710/313; 711/115
See application file for complete search history.

(56) References Cited

U.S. PATENT DOCUMENTS

| | | | |
|---|---|---|---|
| 7,111,121 B2* | 9/2006 | Oishi et al. ..................... | 711/115 |
| 7,159,766 B2* | 1/2007 | Wurzburg et al. ............. | 235/376 |
| 8,060,678 B2* | 11/2011 | Bohm ............................ | 710/105 |
| 2005/0160196 A1* | 7/2005 | Dutton et al. ................... | 710/10 |
| 2009/0131036 A1* | 5/2009 | Liang et al. ................ | 455/422.1 |
| 2010/0049895 A1* | 2/2010 | Liang ............................ | 710/308 |
| 2010/0262726 A1* | 10/2010 | Tauscher et al. ................ | 710/16 |

OTHER PUBLICATIONS

EZ-USB FX2LP USB Microcontroller (Document #: 38-08032 Rev. *K); Cypress Semiconductor Corporation; San Jose, CA; Jan. 26, 2006.*

* cited by examiner

*Primary Examiner* — Glenn A Auve
(74) *Attorney, Agent, or Firm* — King & Spalding L.L.P.

(57) ABSTRACT

A system for high-speed data transfer within a portable device, such as, cell phone or a set-top box, which includes a memory medium and a processor. The system includes a first port for coupling to the processor, and a second port for coupling to the memory medium. Further, the system includes an embedded Universal Serial Bus (USB) host configured for receiving data transfer commands from the processor, and transferring data at high speed between a USB device on the processor and the memory medium. Moreover, a data path is provided between the embedded USB host and the first port.

12 Claims, 4 Drawing Sheets

METHOD AND SYSTEM FOR TRANSFERRING HIGH-SPEED DATA WITHIN A PORTABLE DEVICE

TECHNICAL FIELD

The present invention relates to portable devices, and more particularly to a system and method for providing high-speed communication within a portable device.

BACKGROUND

Recent years have witnessed a proliferation of portable devices, such as set-top boxes, cell phones, music players, video players, and cameras. Many of these devices include memory media for storing information. The memory media (internal or external, such as non-volatile memory cards such as SD cards) may be accessible by the portable device itself, or by an external device such as a PC. Accessing the memory media (as by the processor and/or the external device), however, has not been generally available at high-speed due to design limitations in portable devices.

Typically, memory media, such as flash cards are connected to the processor through input/output, control, and data ports (often having 10-20 or more pins) using a NAND bus, such as the Inter-Integrated Circuit ($I^2C$) bus or the Serial Peripheral Interface (SPI) bus. These buses present a hard bandwidth limit of 60 Mbits/sec, which may prove to be inadequate while transferring real time or bulk media. One major chip design consideration in the last decade has been size. Developers and manufacturers often endeavor to downsize portable devices for better usability and portability, and reduction in the number of data transfer pins can drastically affect the portable device's size.

Therefore, there remains a long-felt but unresolved need for a system or method that transfers data between a baseband processor and memory media at high-speed. There is a further need for a system or method that reduces processor chip size, thereby allowing manufacturers or developers to decrease device size, increasing their portability.

SUMMARY

Briefly described, and according to one embodiment, the present disclosure describes a system for high-speed data transfer within a portable device, such as, but not limited to, a cell phone, a set-top box, a video player or the like, which includes a memory medium and a processor such as a baseband processor or an application processor. The system includes a first port for coupling to the processor, and a second port for coupling to the memory medium. Further, the system includes an embedded Universal Serial Bus (USB) host configured for receiving data transfer commands from the baseband processor, and transferring data at high speed between a USB device on the processor and the memory medium. Moreover, a data path is provided between the embedded USB host and the first port.

Figure 1:
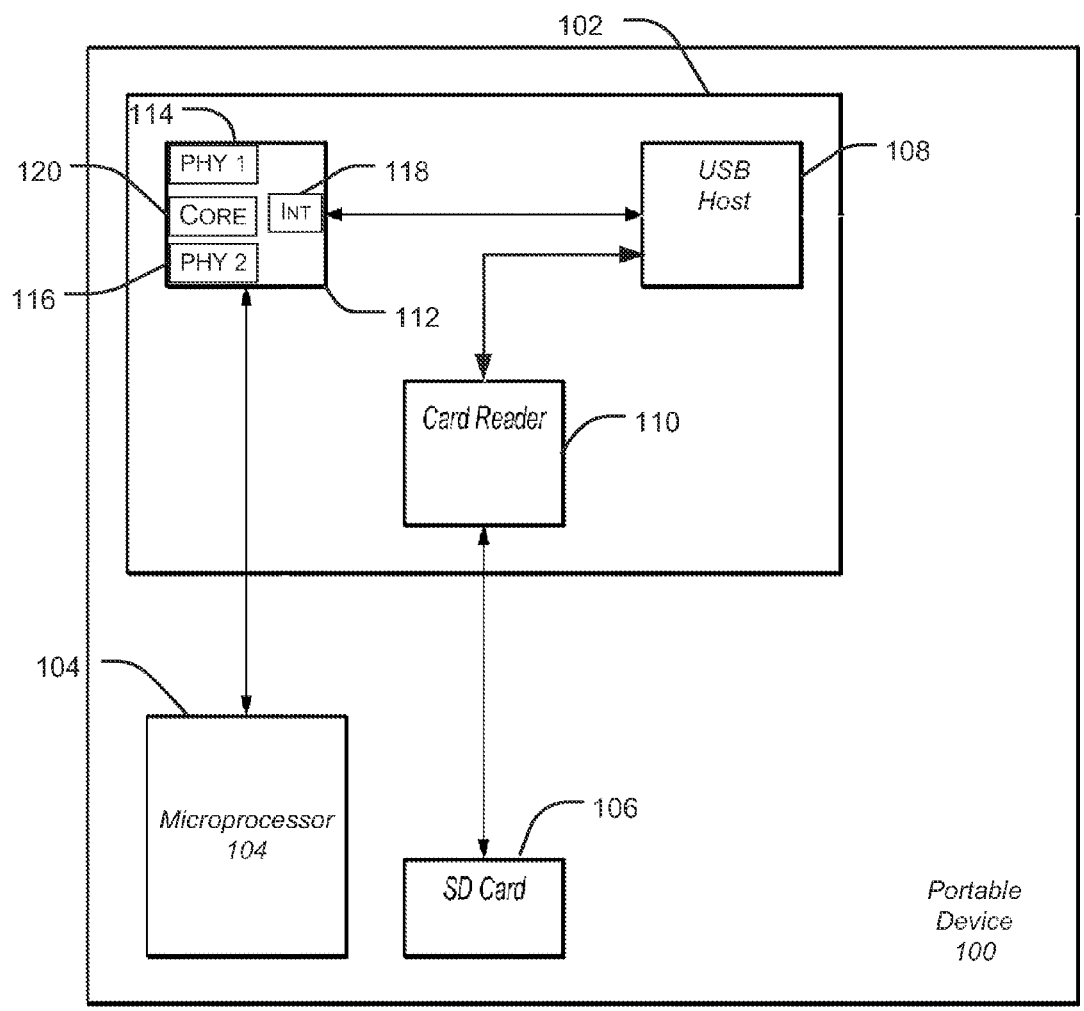
FIG. 1 is a block diagram illustrating a portable device.

While the invention is amenable to various modifications and alternative forms, specific embodiments are shown by way of example in the drawings and are described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION

Overview

Embodiments of the present invention are directed to systems and methods for transferring data at high speed between memory media and a processor of a portable device. Conventional microprocessors include multiple pin/ports, which are connected to the memory media ports through an interface bus. SPI or I2C protocols are utilized to transfer the data between these two modules. These protocols, however, restrict the data transfer speed, increasing total time to transfer data from the memory to the processor and vice versa.

Embodiments of the present invention allow manufactures or developers to reduce the number of memory media or processor pins/port, and allow high-speed data transfer. To this end, the system introduces the USB host, which directly transfers data between the memory media and the baseband processor at high speed. Inclusion of the USB host facilitates removal of the NAND bus and the memory transfer pins of the baseband processor, saving considerable space. This connection greatly reduces chip size, helping reduce the size of portable devices.

Exemplary Systems

FIG. 1 illustrates an exemplary portable device 100 according to some embodiments of the present invention. The portable device 100 may be a cell phone, set-top box, television, MP3 player, or other such portable device. Further, the portable device 100 includes a chip or system 102, a microprocessor 104, and one or more memory media 106. The system 102 aids in transferring data between the microprocessor 104, the memory media 106, and any external device. The microprocessor 104 may be a baseband processor such as a system-on-chip (SoC) processor, or an application processor. The memory media 106 may be any type of media, as desired. For example, the memory media 106 may be non-volatile memory such as flash and/or may be a removable memory medium. For example, the memory medium 106 may be a memory card, such as an SD (secure digital) card, a Multimedia Card (MMC), an electronic Multimedia card (eMMC), or a high-speed SIM (subscriber identity module) card, which stores information (among other types of memory cards such as a memory stick, or a compact flash). It will be understood that many other flash or non-flash memory media are present and may be developed in the future for use with portable devices. None of these memory media is outside the scope of the embodiments of the present invention. The system 102 may support a single or multiple memory media 106 simultaneously or concurrently depending on the application or requirement.

The system 102 includes a USB host 108 and a card reader 110. The USB host 108 may be an embedded host, which controls data transfer between the microprocessor 104 and the memory media 106 without aid from an external device or host. The card reader 110 reads and writes data from the memory media 106. The USB host 108 in turn reads data from the card reader 110 using any SoC bus and then transfers this data to the microprocessor 104 through a high-speed pathway. In the opposite direction, the USB host 108 can read data from the microprocessor 104 and write the data onto a memory medium 106 through the card reader 110. Any SoC bus may be utilized to connect the USB host 108 and the card reader 110, such as an Advanced Microcontroller Bus Architecture (AMBA) or AMBA High-performance Bus (AHB). In some portable devices, the system 102 may include a USB hub 112, which includes an upper USB physical layer (PHY) port 114, a lower USB PHY port 116, a PHY interface 118, and a hub core 120. The USB host 108 may utilize the lower USB PHY port 116 through the PHY interface 118 as a pathway to transfer data to the microprocessor 104. The interface between the USB hub 112 and the microprocessor 104 may be any of various USB analog or digital interfaces, such as HSIC, ULPI, and SLPI.

Figure 2:
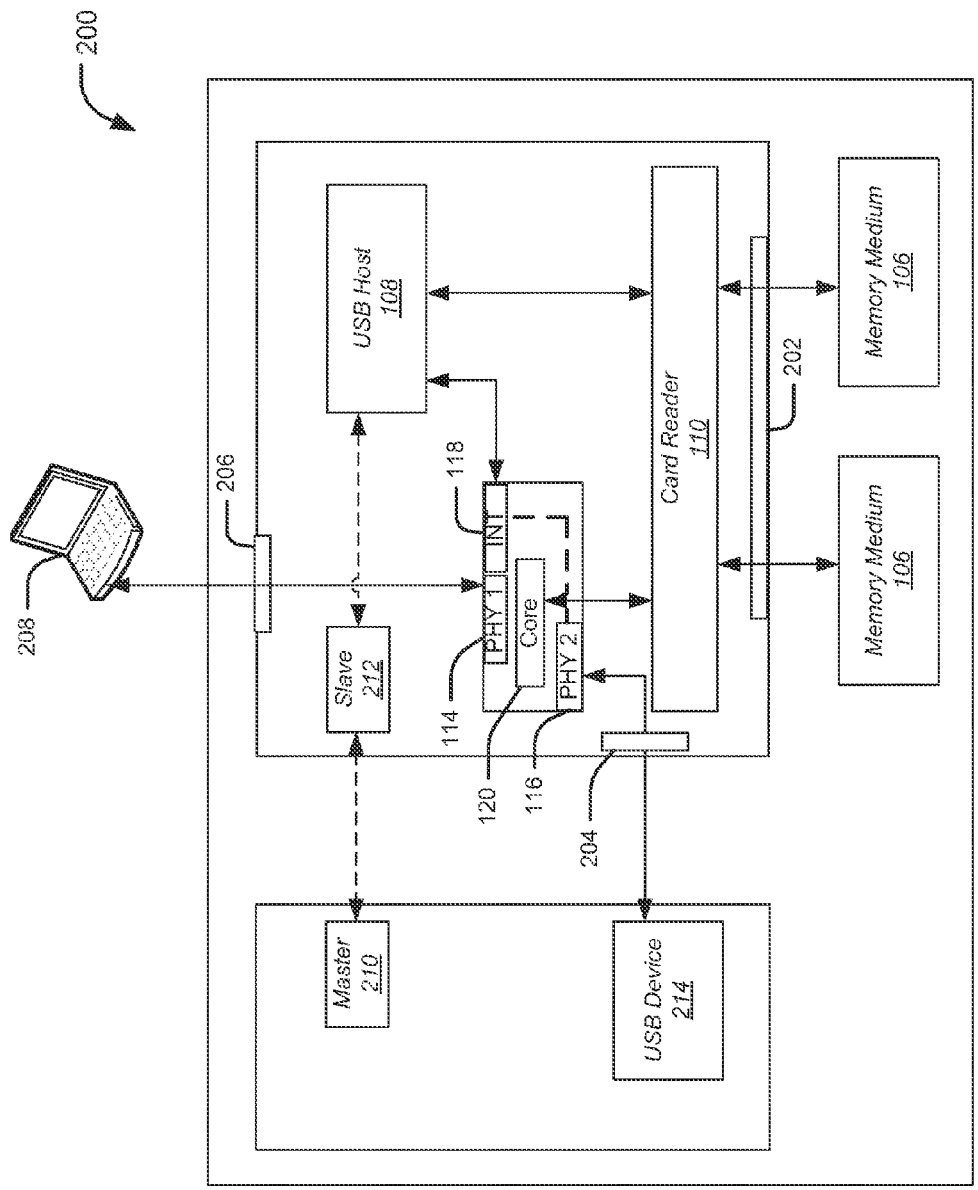
FIG. 2 is an exemplary block diagram illustrating a data transfer system.

FIG. 2 illustrates an exemplary data transfer system, which is a more detailed diagram of the portable device 100. Here, the system 102 includes a first port 202 between the system 102 and the microprocessor 104, a second port 204 between the memory media 106 and the system 102, and a third port 206 between the system 102 and an external device 208 such as a desktop, laptop, or any other computing device, which includes a USB host. The ports 202 and 206 can be USB 2.0 ports, full-speed USB ports or USB 1.0 ports.

The system 102 also includes an SPI/I2C slave 210, which may communicate with the processor 104 via an SPI/I2C master 212. The baseband processor 104 may communicate various commands/information to the system 102 via blocks 210 and 212. For example, the baseband processor 104 may power off the system 102 using a power off command, or it may request to view the memory media's file system, although other commands are envisioned. The master-slave blocks 210 and 212 may function based on protocols such as I2C, SPI, SMB, or other such protocols without departing from the scope of the present invention.

The baseband processor 104 further includes a USB device 214, which may include an integrated USB PHY or an external PHY. The device may be high-speed, full-speed, USB 1.0, or a combination device.

In some portable devices, the system 102 and microprocessor 104 may include other blocks and modules or may include blocks and modules that replace certain other mentioned blocks or modules. For example, the system may include modules such as a direct memory access (DMA) controller, or an 8051 microcontroller. The microcontroller may be a part of the card reader 110 or a separate entity, which may be configured to perform various DMA procedures during data transfers, such as USB transfers. The microprocessor 104, similarly, may include a power module or a clocking module.

Figure 3:
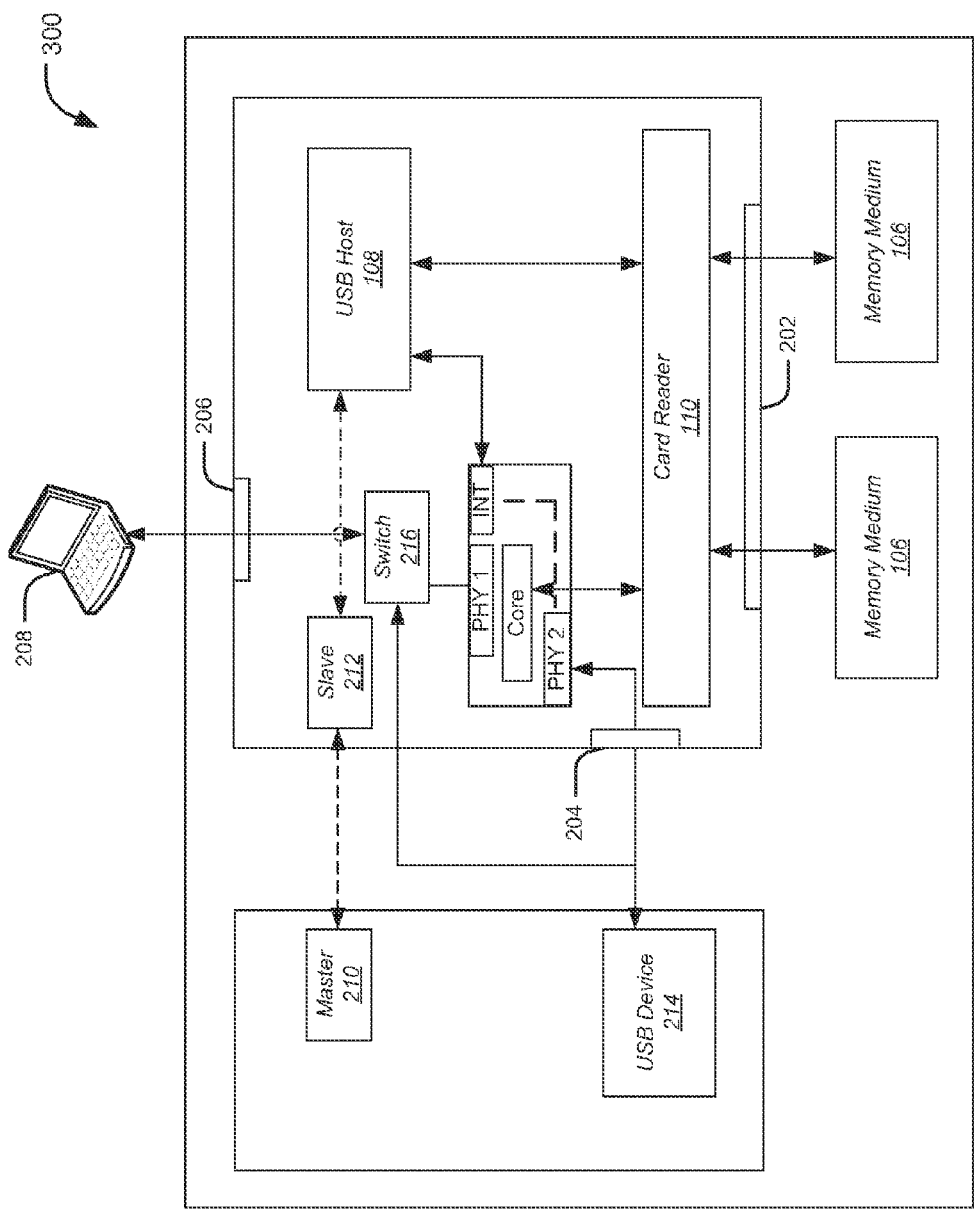
FIG. 3 is an exemplary block diagram illustrating an alternative embodiment of the data transfer system of FIG. 2

The system 102 may also include a switch 216 for connecting the third port 206 to both the ports 202 and 204. FIG. 3 illustrates the switch 216, which may connect the port 206 directly to port 202 or alternatively, connect the port 206 to the USB hub 112. From the USB hub 112, the external device 208 may be connected to either port 202 or port 204. The external device 208 typically includes its own USB host, which enumerates the memory medium 106 and writes or reads data to or from the memory medium 106 through the USB hub 112. While connecting with the baseband processor 104, the USB host present on the external device 208 may enumerate the USB device 214 on the baseband processor 104 through the USB hub 112 or directly.

Whenever a user of the portable device 100 requires access to media stored in the memory media 106 (for instance, to activate an installed game, watch a video, view photographs, or listen to music) the user, through a graphical interface, invokes the required media. Here, the master 212 requests for information from the slave 210, such as system file allocation, or other file related information. The slave device 210 receives the queries and forwards them to the USB host 108. The USB host 108, in turn, requests the information from the required memory medium 106 through the card reader 110.

When the baseband processor 104 requires data from the memory medium 106, the USB host 108 sends a command to the card reader 110, which reads the requested data from the memory medium 106 and transfers the read data to the USB host 108. For this transfer, the system 102 may utilize any SoC transfer protocol or bus such as AHB. The USB host 108 transfers the received memory data to the USB device 214 through a physical data path. This data path is a connection between a digital PHY present on the USB host 108 and the PHY interface 118 on the USB hub 112. The PHY interface 118 bypasses the hub components and transfers the memory data directly to the lower PHY port 116, which is directly connected to the USB device 214 through the port 202.

Alternatively, the USB host 108 may include an integrated PHY. In this case, the USB host 108 may enumerate the USB hub 112 through the switch 216, which is connected to the hub's upper USB PHY port 114. The data is transferred through the USB hub core 120 to the USB device 214.

Exemplary Methods

Figure 4:
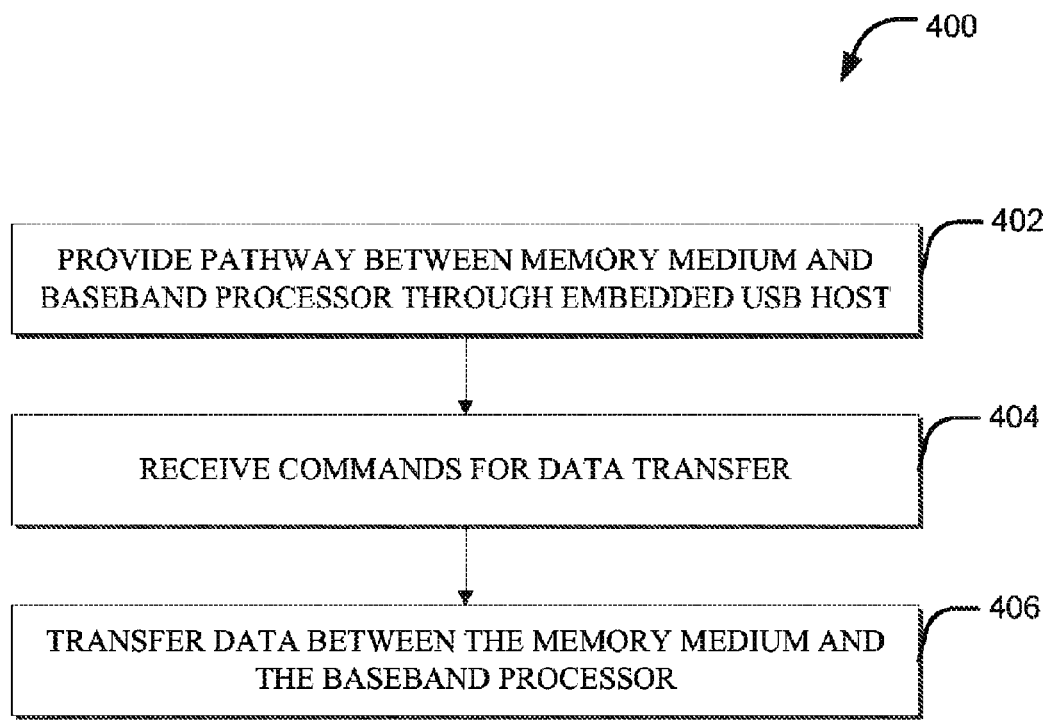
FIG. 4 is a flowchart illustrating an exemplary method for transferring high-speed data between a baseband processor and a memory medium.

FIG. 4 illustrates an exemplary method 400 for transferring high-speed data between the memory media 106 and the baseband processor 104. The method 400 illustrated in FIG. 4 may be used in conjunction with any of the systems or devices shown in the previously described figures, among other devices. In various embodiments, some of the method elements shown may be performed concurrently, in a different order than shown, or may be omitted. Additional method elements may be performed as desired. As shown, the method 400 may operate as follows.

At step 402, a connection is established between the memory media 106 and the baseband processor 104 through the ports 202 and 204. The connection may be established by logic of the system 102 as described previously in FIGS. 1-3.

For example, the port 202 may connect the memory media 106 to the card reader 110, which in turn may be connected to the USB host 108. The USB host 108 writes data from the memory media 106 to a USB device 214 or reads data from the USB device 214 and writes it on the memory media 106. The USB host 108 may or may not include an integrated PHY. If the USB host 108 does not include an integrated PHY, it may transfer the data to or from the USB device 214 through the PHY interface 118 and the PHY port 116 of the USB hub 112. Alternatively, if the USB host 108 includes an integrated PHY, it can transfer data to the USB device 214 through the USB hub core 120.

The connection may be established according to various protocols. For example, the connection may be established according to USB protocols through an enumeration process. It will be understood, however, that various on-to-go (OTG) protocols may be used, as desired. Moreover, as described previously, the portable device 100 may be any of a variety of devices such as cell phones, portable media players, set top boxes, PDAs, televisions, etc.

At step 404, the USB host 108 receives commands from the baseband processor 104. The commands may include instructions to view the memory medium's file system, folder structure, available memory, utilized memory and other such instructions. If the baseband processor 104 requires any media from a particular memory medium 106, the baseband processor 104 sends commands to that effect through the master-slave blocks 210 and 212. Alternatively, the baseband processor 104 may desire to push some data onto the memory medium 106, such as record a live program, or save a current game. Here, the SPI/I2C master 212 on the baseband processor 104 may send the commands to the SPI/I2C slave 210, which transfers the commands to the USB host 108.

Based on the command issued by the SPI/I2C master 212, the USB host 108 may transfer data from a selected memory medium 106 to the baseband processor 104 or from the baseband processor 104 to the memory medium 106 at step 406. The USB host 108 enumerates the USB device 214, provides memory address information, and configures the USB device 214. Once enumerated, the USB device 214 is able to access the contents of the memory medium 106 via its internal USB stack. In the situation where the baseband processor 104 requires data from the memory medium 106, the USB host 108 retrieves the requested data from the memory card reader 110 using any suitable data transfer protocol or bus such as AHB. Then, using either the USB hub's PHY interface 118 or its own integrated PHY interface (whichever is available), the USB host 108 transfers the data to the USB device 214 at high or full USB speed. Various protocols may be utilized for data transfers between the USB host 108 and the USB device 214; for example, the system 102 may utilize a USB class driver for mass storage, an object-oriented protocol such as media transfer protocol, or any other suitable data management protocol.

Alternatively, the USB host 108 utilizes the data path in a reverse direction to transfer data from the USB device 214 to the memory media 106.

Thus, the USB host 108 of the portable device 100 (i.e., of the system 102 in the portable device 100) may allow for high-speed connections between the baseband processor 104 and the memory media 106 associated with the portable device 100. Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system for data transfer within a portable device, the portable device including a memory medium and a baseband processor, the system comprising:
    a first port for coupling to the baseband processor;
    a second port for coupling to the memory medium;
    an embedded Universal Serial Bus (USB) host configured for:
        receiving commands from the baseband processor to transfer data between the memory medium and the baseband processor; and
        transferring data between a USB device on the baseband processor and the memory medium;
    wherein the embedded USB Host includes an integrated PHY interface; and
    a data path between the embedded USB host and the first port; and
    at least one of an Inter-Integrated Circuit (I2C), Serial Peripheral Interface (SPI), or Server Message Block (SMB) slave interface to receive and forward the commands from the processor to the embedded USB host.

2. The system of claim 1, wherein the data path is through a USB hub providing a USB connection according to at least the USB 2.0 specification between the baseband processor and the USB host.

3. The system of claim 1, wherein the data path is through a physical layer (PHY) interface and a PHY port of the USB hub.

4. The system of claim 1, wherein the data path is through a PHY port and a core of the USB hub.

5. The system of claim 1 further comprising a third port for coupling to an external device, the port being a USB port.

6. The system of claim 5, wherein the external device is a computing device with an embedded USB host.

7. The system of claim 5 further comprising a switch for coupling at least one of the first port to the third port, or the third port to the USB hub.

8. The system of claim 5, wherein the USB hub disconnects the third port during data transfer between the first port and the second port.

9. The system of claim 1 further comprising a memory medium reader coupled to the second port and the USB hub.

10. The system of claim 1, wherein a protocol for transferring the read data to the USB device includes at least one of a USB Class Driver for Mass Storage protocol or a Media Transfer Protocol (MTP).

11. The system of claim 1, wherein the memory medium includes at least one of:
    a secure digital (SD) flash memory card;
    a MultiMediaCard (MMC) flash memory card;
    a memory stick (MS) flash memory, or
    an electronic MultiMediaCard (eMMC) memory device.

12. The system of claim 1, wherein the embedded USB host is further configured to:
    enumerate the USB device on the baseband processor;
    provide address information to the USB device; and
    configure the USB device.

* * * * *